Dec. 22, 1959    B. COX ET AL    2,918,662

MAGNETIC TAPE ARRANGEMENT SYSTEM

Filed June 3, 1957      5 Sheets-Sheet 1

INVENTORS
BONNAR COX
JACOB GOLDBERG
BY Lyon & Lyon
ATTORNEYS

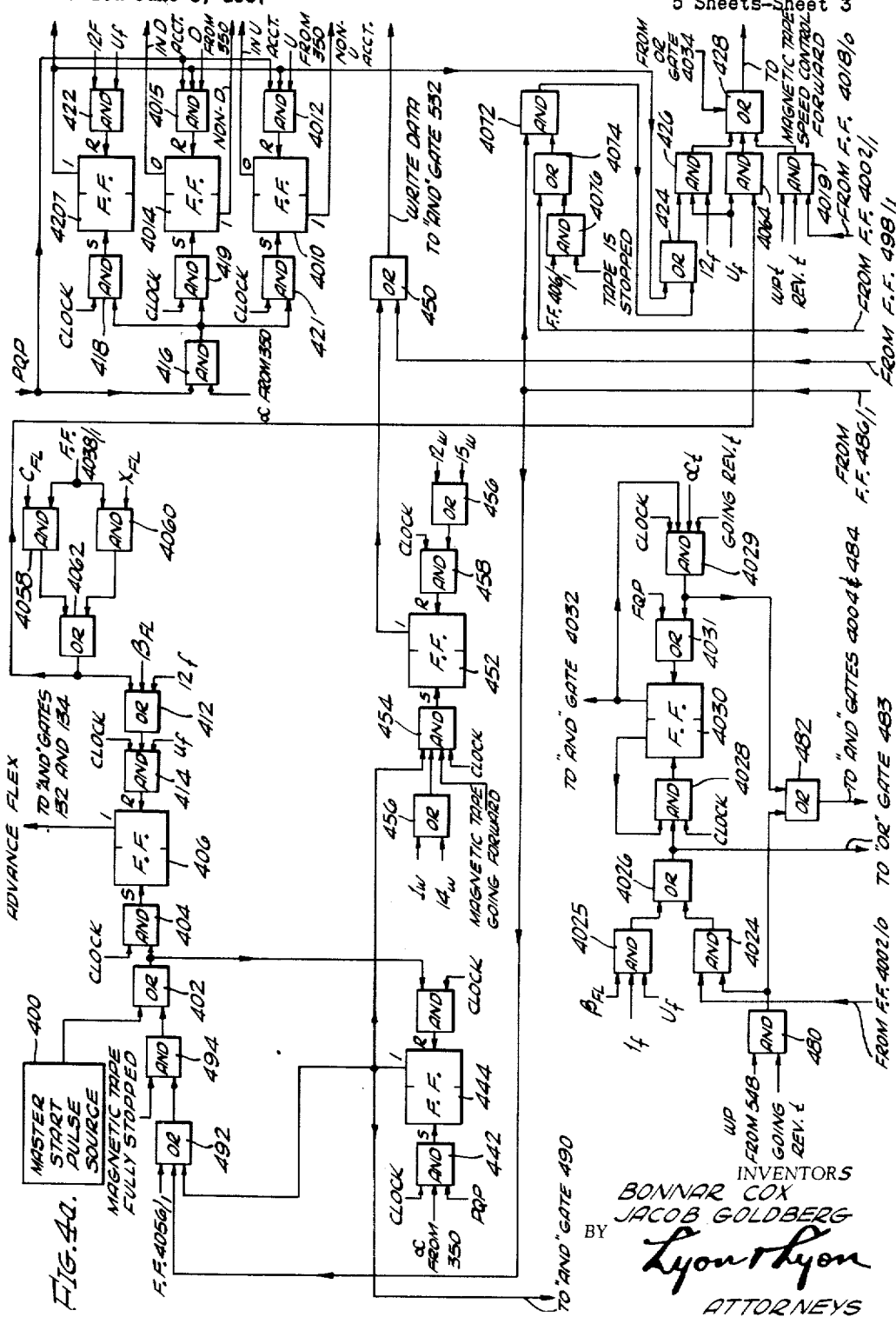

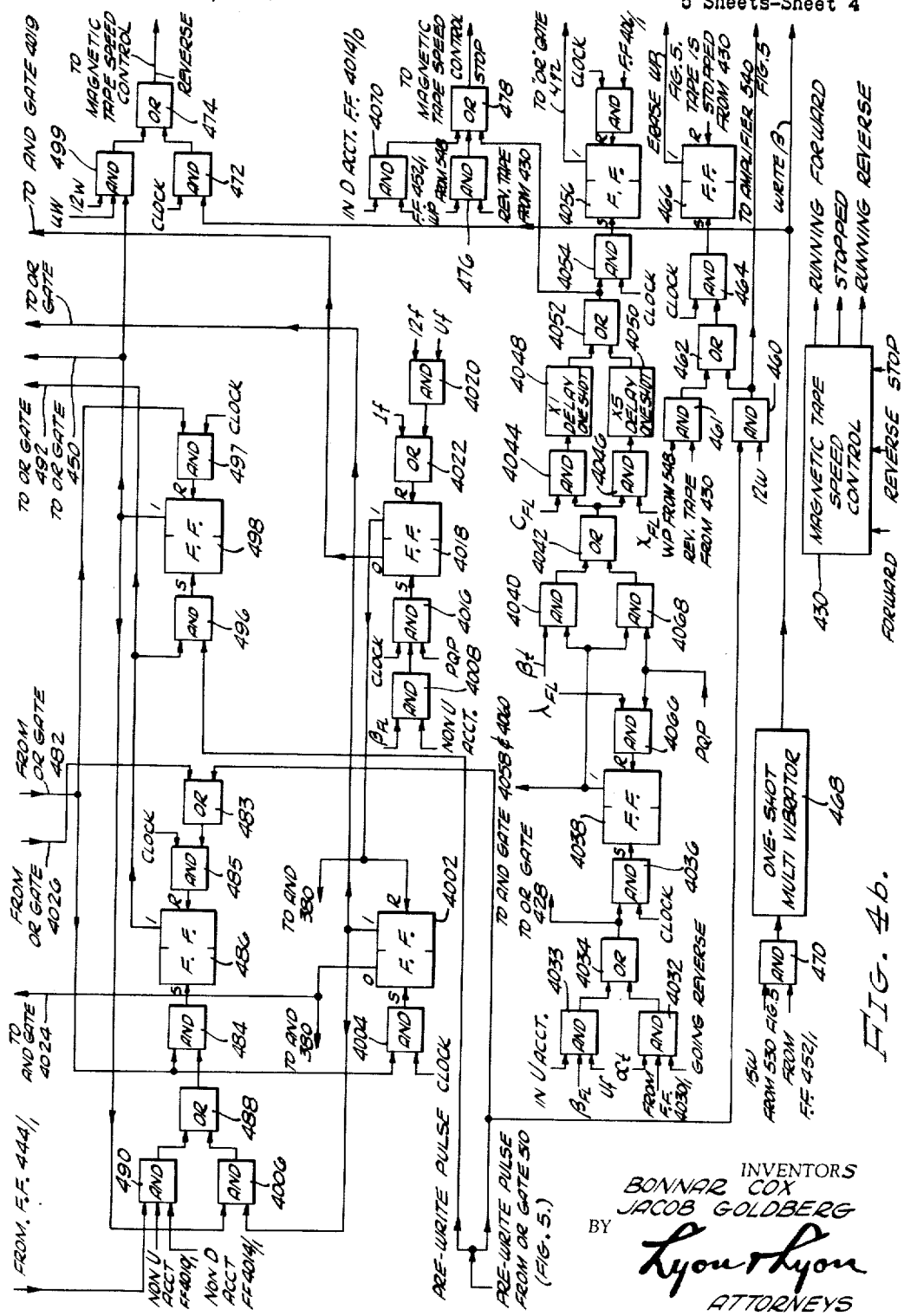

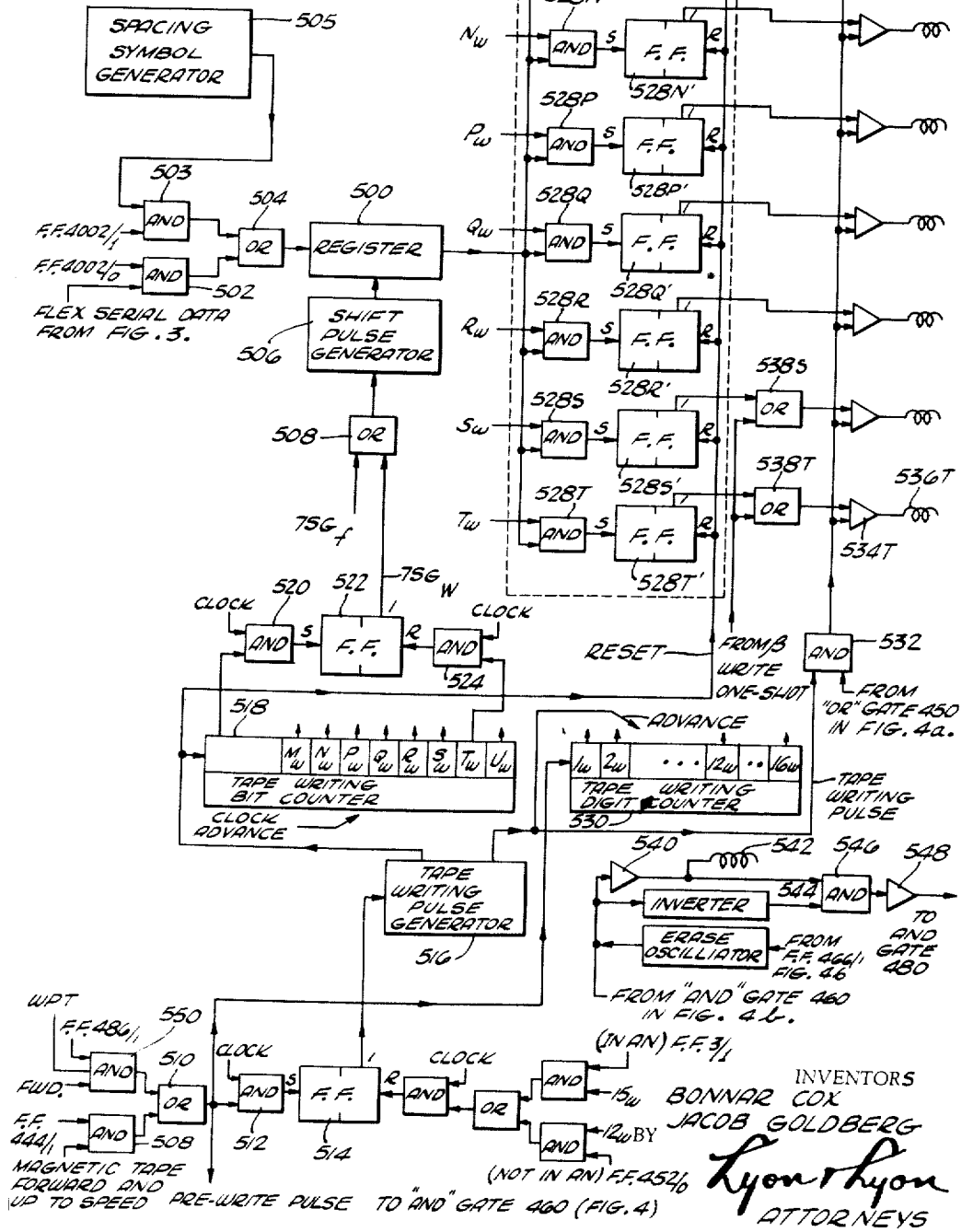

United States Patent Office 2,918,662
Patented Dec. 22, 1959

2,918,662

MAGNETIC TAPE ARRANGEMENT SYSTEM

Bonnar Cox and Jacob Goldberg, Palo Alto, Calif., assignors, by mesne assignments, to General Electric Company, New York, N.Y., a corporation of New York Application June 3, 1957, Serial No. 663,180

7 Claims. (Cl. 340—174)

This invention relates to information-handling machines and, more particularly, to an improved system for establishing from data recorded on one storage medium a format for receiving future data on a second storage medium.

Information-handling machines now extant usually employ a number of magnetic tapes to store data which has been processed by the machine. Usually some arrangement is made to associate that data with previously stored data on the tape. For example, if the information-handling machine is an inventory-control system, then the processed data is associated with the name of the item to which it relates which was previously written at a particular location on the tape. If the type of information-handling machine is employed in accounting or banking practices, then it is desirable to associate the data with an identifying account number with which the data is to be associated. In order to enable such associations to occur, it is necessary to preliminarily prepare the magnetic tape or storage medium. That is, considering the information-handling machine which processes bank data, by way of example, it is necessary to first write on the magnetic tape the account number and other associated data for each account to be handled and then to allot space for the writing of data which represents transactions which occur over a period of time.

An object of the present invention is the provision of a novel control system for making up a data-storage medium from format data which is stored on another storage medium.

Another object of the present invention is the provision of a novel system for establishing activity-recording space on a storage medium in response to control data recorded on another storage medium.

Yet another object of the present invention is the provision of the unique arrangement for controlling magnetic tape makeup from data recorded on punched paper tape.

These and other objects of this invention are achieved by the provision of a unique system for reading coded data including instruction signals which is recorded on one storage medium in response to which data is written, a format is established, and space for recording future transactions is allotted on a second storage medium.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 4a and 4b are block schematic diagrams of the logic required for establishing a format in response to the data which has been read; and Figure 5 is a block schematic diagram of the arrangement required for writing on magnetic tape.

In order to facilitate an explanation and understanding of this invention, it will be described in connection with making up an elongated storage medium such as magnetic tape for the recording transactions occurring during the operation of a banking business. This is not to be construed as a limitation on the invention, since it will be readily recognized that the inventive concept is applicable for the making up of a storage medium for the use thereof in storing information received during the conduct of businesses other than banking.

In the banking business, each customer or depositor is identified by an account number. A record is kept of all the transactions which occur for each account number. These transactions usually consist of deposits and withdrawals. Thus, in providing a space for an account, there must be allotted what may be termed an activity space in which the transactions for that account are recorded. Since all accounts do not have the same activity, it must be previously determined as to whether to allot a fixed amount of space for all accounts or to attempt to predict from past experience and from the type of account what amount of activity space will be required for future transactions.

Another situation which arises is one which is due to the nature of the banking business. An account may be rendered inactive—that is, the account may be closed out. However, the account number is still carried in its proper space for the purpose of reassignment to a new depositor at some future date. No space is allotted for this type of account, other than that required to record the account number. Another situation which must be taken care of is the one wherein an account number is provided which will be assigned to the next customers or new depositors who enter the bank. Some space must be allotted for the transactions expected after such number has been assigned.

Figure 1:
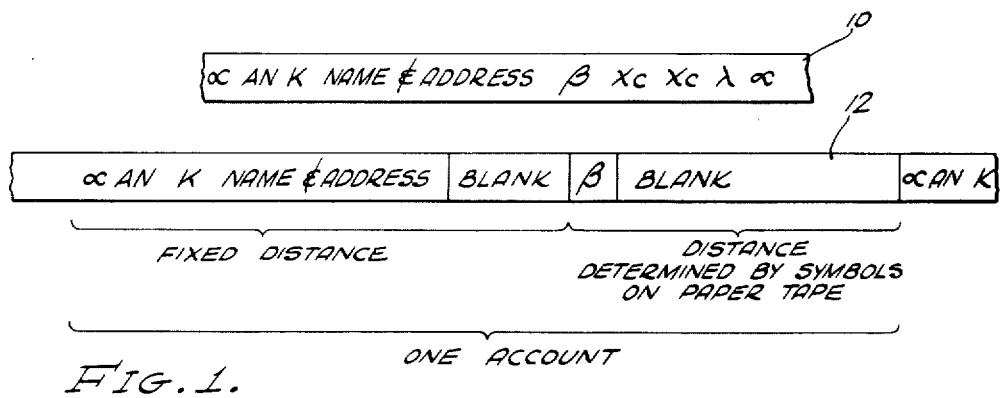
Figure 1 illustrates a fragment of paper tape and a fragment of magnetic tape prepared therefrom in accordance with this invention.

Figure 1 illustrates an arrangement on a magnetic tape 10 which was used in an embodiment of the invention which was built to handle the transactions occurring in the banking business. Of course, a recording on magnetic tape occurs in the form of a code, none of which is visible to the naked eye. However, in order to render this invention understandable, the representation shown in Figure 1 will have the various symbols, letters, etc., written out on the tape fragment 10, just as if it were possible to see the recording on the tape. The magnetic tape fragment was prepared from a paper tape 12 on which is punched in code symbols for instructing logical apparatus to lay out on magnetic tape the format desired—which is the one shown in Figure 1. Each new account number is indicated by a symbol alpha. This is followed by the digits of the account number which here are represented by the symbols AN. The digits of the account number are then followed by a symbol indicative of the type of account which this depositor has.

As indicated above, there may be several different types of accounts, not only active and inactive, but also commercial, noncommercial, etc. In order to simplify the explanation required herein, one of three symbols will be placed after the account number. A "K," as shown in the drawing, represents the fact that an active account is present. A "U" in this symbol space represents the fact that the account number is to be assigned to the next depositor entering the bank. A "D" represents the fact that this is an inactive account and the account number is being maintained for a safe period until such time as it can be reassigned to some future depositor.

A "K" or a "U" symbol is to be followed on magnetic tape by a space in which the name and address of the depositor will be placed. Of course, if the account is not yet assigned, a space is left on magnetic tape for the name and address. On the paper tape if the account is a "U" account, a beta symbol immediately follows the "U" symbol. If it is a "D" account, then the "D" symbol is followed by the next account. After the name and the address, a small blank space is permitted which is followed by the symbol "beta." The space on the magnetic tape between the alpha and the beta is a fixed distance, being the same for all except the "D" account. In the case of "D" accounts, the space allotted as on the paper tape is merely sufficient to record an alpha symbol, an account number, and a "D" symbol.

For other than "D" accounts on magnetic tape, the beta symbol is followed by a blank space which is terminated by the occurrence of the next alpha signifying the beginning of the next account. The extent of this blank space is a function of the type of account. This blank space is the allotted future transaction recording space. This future transaction space is controlled by the "X" and "C" symbols written on the paper tape. After the last space allotment symbol on the paper tape, a symbol lambda appears. This is followed by the alpha symbol for the next account. It is customary to send statements to depositors whose activity so warrants every month. Thus, it is possible to print out from the tape the data which is recorded thereon which customarily is included in such statements.

When first making up a magnetic tape to handle future activity, the data for its make-up is usually recorded on another storage medium. In an application by these inventors, which is entitled, Tape-Spacing System, filed February 5, 1957, Serial No. 638,292, there is described an arrangement for making up one tape from the data contained on a second magnetic tape. In that system the space allotted for recording transactions was computed based upon the amount of space required for recording transactions over the previous recording interval. In this application, the recording medium containing the data for making up the tape is preferably punched-hole paper tape. The punched-hole tape is first made from information contained in bookkeeping ledgers. A special commercially available typewriter known as a "flexowriter" is employed to punch coded holes in tape. No mathematical computation of the transaction recording distance between the beta symbol and the succeeding alpha symbol is made in this connection. The extent of the space to be allotted is recorded on the paper tape as the "X" and "C" symbols which are read and used for establishing the required space for transactions. Thus, it may be seen from the above and from the following description that a system is shown which makes up a tape format automatically entirely from data and symbols recorded on another tape.

In order to assist in an understanding of this invention, there follows a summary of the operations which occur in laying out the format described on the magnetic tape. It is believed that these operations may be most succinctly shown and understood by a flow diagram of the type shown in Figure 2. The operations proceed along the lines in the direction of the arrowheads. Commands appear to the left of the lines and resultant signals appear to the right of the lines. OR gates in the lines are represented by a shaded circle with inputs represented by arrowheads terminated on the circumference. Output is represented by the line connected to the center of the shaded circle. The following discussion will make the flow diagram still more clear.

Figure 2:
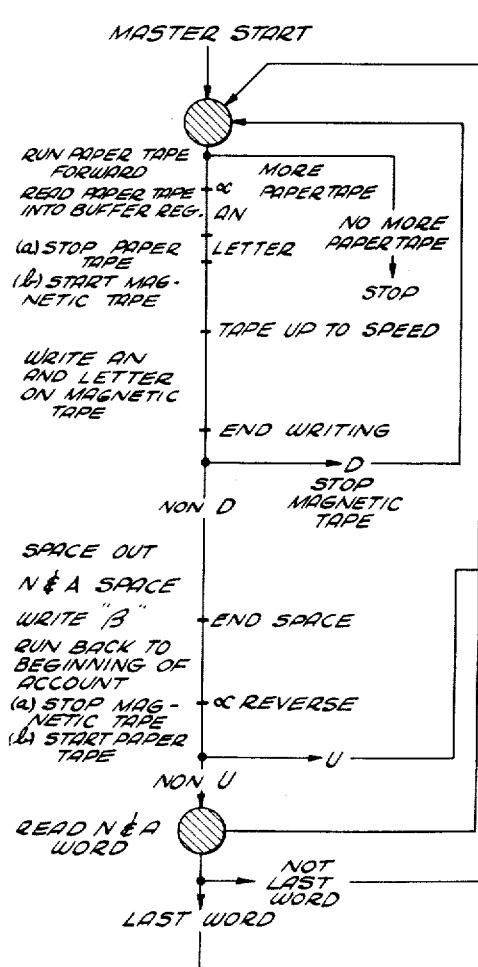
Figure 2 is a flow diagram of the operations occurring in this invention.
Figure 2:
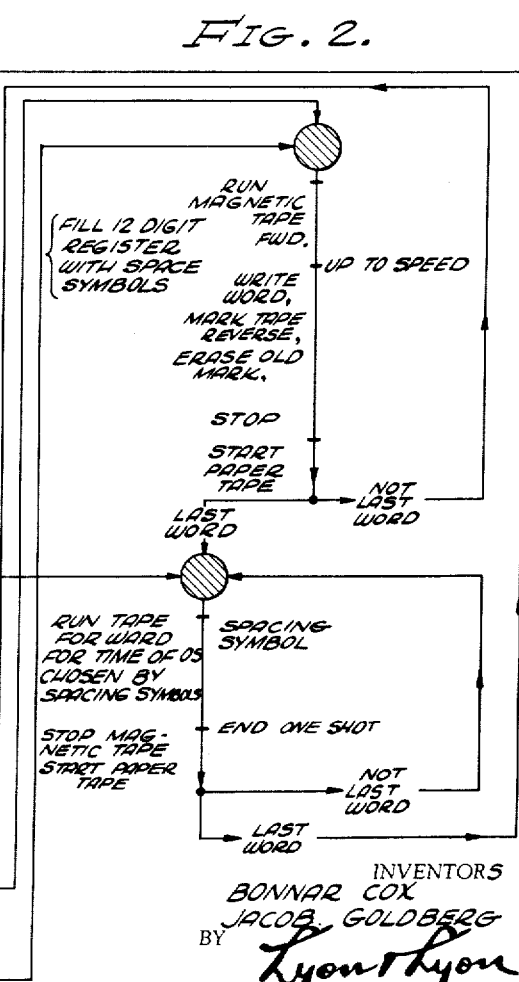

Referring now to the flow diagram shown in Figure 2, at the beginning of the operation, both the magnetic and the paper tapes are standing still. A master start pulse initiated from a suitable source, such as an information-handling machine, causes the paper tape to commence running forward. When an alpha symbol is read on the paper tape, the account number and the category symbol which are recorded on the paper tape following the alpha symbol are also read into an intermediate buffer register. An auxiliary timing counter is employed to count the number of digits contained in the account number and the category symbol. This is predetermined to issue an output when 12 digits have been counted. Each digit consists of six binary bits. Therefore, as soon as the count has reached 12, the paper tape is instructed to stop. The magnetic tape is then instructed to run forward, and as soon as the magnetic tape attains the proper writing speed, the contents of the intermediate buffer register are emptied onto the magnetic tape. As soon as this data is written, a pulse which is hereafter termed a "word pulse" is written on a special track on the magnetic tape which is adjacent to the tracks containing the data. This word pulse is written adjacent to the account classification symbol. This word pulse is later used to signal the position for entry of the name and address data for this account on the tape.

The magnetic tape continues to run forward after the contents of the register have been emptied onto the tape. A special timing circuit is triggered after the register has been emptied. This timing circuit measures a fixed interval which, when ended, produces a signal which causes the writing of a beta symbol. After the writing of the beta symbol, the magnetic tape is stopped, reversed, and run backwards until the alpha symbol which was previously written is seen going in the reverse direction. At this time, the magnetic tape is stopped again and the punched paper tape is started.

In running forward, the next data which is read from the punched paper tape is the name-and-address data. The name-and-address data is usually much longer than the contents of the single buffer register which is employed to transfer the paper tape data onto the magnetic tape. Therefore, a number of cycles occur in which the punched paper tape is run forward until the register is filled, the paper tape is stopped, the magnetic tape is run forward until the register is emptied, the magnetic tape is stopped and reversed, and the paper tape is then run forward again until the register is filled, etc.

A further requirement on this data is that although the incoming name and address data may be any length up to a certain maximum, it is required that this data, as it appears on the magnetic tape, be module 12 in form. As a result, when the beta symbol is read from the punched paper tape, indicating the end of the paper tape name and address data, a special circuit is operated which serves to fill the buffer register with extra symbols, if required, which will cause the data read from the buffer register to be modular 12 in form.

After the last name and address word has been transferred onto the magnetic tape, the punched paper tape is run forward until a special spacing symbol is recognized, and then the punched paper tape is stopped. Upon recognition of this special spacing symbol, the magnetic tape is run forward while a one-shot multivibrator timing circuit is triggered. At the end of the timing period established by this multivibrator a pulse is delivered which causes the magnetic tape to stop. This, in turn, causes the starting forward of the paper tape. If another spacing symbol is read, then the magnetic tape is run forward an additional distance which is timed by the multivibrator. This continues until all spacing symbols which have been placed on the paper tape have been considered. Any number of different symbols may be employed, which, upon recognition, can be used to trigger different timing multivibrators. For the purposes of the present invention, two different symbols are employed, recognition of which causes one or the other of two multivibrators having approximately a five-to-one ratio to be energized. The short-time one-shot multivibrator is triggered by the recognition of an "X" symbol, and the long-time one-shot multivibrator is triggered by the recognition of a "C" symbol. After the last spacing symbol has been recognized, the paper tape is run forward until the next alpha symbol is seen. This indicates the beginning of the next account.

There are two exceptions to the foregoing description. The first exception occurs in the case of the "D" account. The "D" account is an inactive account, not assigned to any depositor. Therefore, after the writing of the account number and the "D" category letter, the magnetic tape is simply stopped. No name and address space or data and no item space is allotted for a "D" account. The other exception is the case of the "U" account. As defined previously, this is an account which is expected to be assigned to a new customer during the coming transaction interval. It is therefore necessary to allot space on the tape, so that the name and address of this new customer and any items which he may have for the coming month may be entered onto the magnetic tape. After the writing of the account number for the "U" account, a spacing for the name and address and the writing of the beta symbol occurs as described previously. A symbol indicative of the desired spacing is then provided, whereby a fixed standard amount for "U" accounts is allotted for future transactions.

Figure 3:
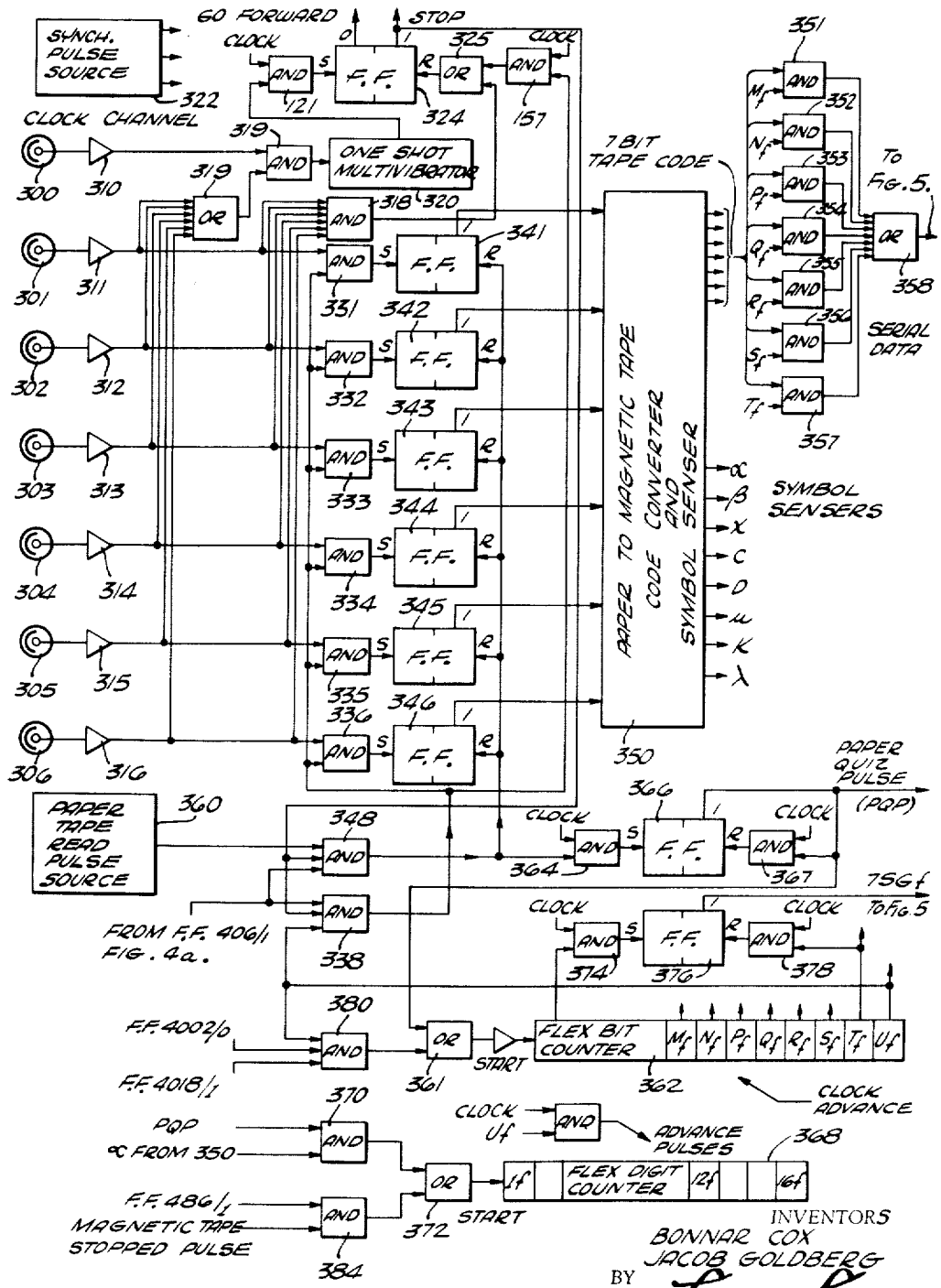
Figure 3 is a block schematic diagram of the input circuit from the paper tape.

Referring to Figure 3, there may be seen a block diagram of the input circuit from the paper tape. For the purposes of describing this invention, assume that a six-binary-bit code is employed on the paper tape, along with a clock channel hole for each digit represented by the six bits. The usual photoelectric paper-tape reader may be used which includes at a reading position a light which shines upon the tape and seven photocells, respectively 300 through 306, for reading data, as well as the clock-channel hole which must always exist adjacent the data holes. The output of these seven photocells are respectively applied to seven amplifiers 310 through 316. The output of the six data amplifiers 311 through 316 are respectively applied to an OR gate 317 and to an AND gate 318. OR gate 317 signifies by its output the presence of one or more data holes. Outputs from OR gates 317 and clock-channel amplifier 310 are applied to an AND gate 319, which thereby is enabled to trigger a one-shot multivibrator 320. This multivibrator, when triggered, immediately applies its output to an AND gate 321. In order to provide an output, this AND gate also requires the application to its input of a clock pulse.

In common with all present-day information-handling machines, there is used in the operation of this invention what may be termed a clock-pulse, or synchronizing pulse, source 322. The output of the synchronizing pulse source consists of clock pulses which time the operation of this entire system. The synchronizing pulse source may consist of pulses derived from a highly stable oscillator or from a rotating magnetic drum which may be employed in the machine.

The presence of the clock pulse and the output of the one-shot multivibrator 320 enable the AND gate 121 to apply an output to trigger the flip-flop circuit 324 to its "set" condition. Flip-flop circuits are the well-known two-stable-state trigger circuits, one stable state of which is designated as a "set" stable state, the other as a "reset" stable state. Output from the trigger circuit, when in its "set" stable state, is designated as "one" and when in its "reset" stable state is designated as "zero." The one-shot multivibrator 320 is an astable trigger circuit which, when an input is applied thereto, is driven into its unstable condition from its stable condition. The length of time it remains in the unstable condition is determined by the time constants of the circuit components employed.

Flip-flop 324 is triggered to its set condition by the circuits described whenever data has been read. In its set condition, its output causes the motors which advance the paper tape (not shown) to stop. The paper tape is stopped after each digit is read, in order to enable the following circuitry to process the data conveyed by the code embodied in the presence or absence of holes. When this is finished, then the flip-flop 124 is reset in a manner to be described, enabling the paper-tape advance mechanism to operate again. When all six data holes are simultaneously present, then the AND gate 318 is enabled to reset the flip-flop 124 through an OR gate 325. The reason for providing this operation is that the presence of all six data holes is meaningless and invalid and therefore the tape should be kept moving until a valid digit or character is read.

The output of the reading amplifiers 311—316 are respectively applied to AND gates 331—336. When all these AND gates simultaneously receive an enabling input from another AND gate 338, they apply their outputs to associated flip-flop circuits 341—346 which will be set or reset accordingly to provide an output voltage pattern representative of the digit or character represented by the data holes. These flip-flop circuits are all reset prior to reading each digit by the output from an AND gate 348.

The voltage pattern representative of the data read from the paper tape is applied to circuits represented by the rectangle 350 and designated as the paper-to-magnetic-tape code converter. The output of the paper-to-magnetic-tape code converter and serializer consists of seven binary bits in parallel, representative of the six-bit input, and also an output on one of several leads indicative of which symbol has been sensed. The purpose of the code conversion is to obtain a representation which is more suited to error detection in magnetic-tape reading than is the standard code used in commercial paper-tape typewriters. The seven binary bits are respectively applied to AND gates 351—357, which are sequentially enabled by the outputs from a counter which are respectively designated as $M_t$, $N_t$, $P_t$, $Q_t$, $R_t$, $T_t$. The thus serialized outputs of the AND gates 351—357 are all applied to an OR gate 358.

The timing of the reading of the paper tape is established by a paper-tape reading source 360. This paper-tape read-pulse source provides pulses which occur at the rate desired for reading the data on the punched paper tape. These pulses may be provided by an oscillator, or by a rotating drum, or by a cycle counter actuated from the clock-pulse source. The output of the paper-tape reading-pulse source is applied to the AND gate 348. A second required input to this AND gate is output from flip-flop 324 when in its set or stopping condition. A third required input is an output from a flip-flop 406 in Figure 4, which is the command to resume reading.

AND gate 338 has as two of its required enabling inputs the same two required inputs for AND gate 348, namely, a set output from flip-flop 324 and a set input from flip-flop 406. The last enabling input is received from a paper-tape bit counter 362 when in its last count condition, here designated as $U_t$. The counter 362 is the one which produces the serializing count outputs $M_t$—$T_t$. State $U_t$ follows $T_t$. A six-count delay precedes state $M_t$. Thus, the counter has a count capacity of 14. The output of AND gate 348, besides resetting flip-flops 341—346, is applied to an AND gate 364 which, in turn, upon receiving a clock pulse also from the source 322, sets a flip-flop 366. The output of this flip-flop when in its set condition performs many functions, one of which is to start the counter 362, which is advanced on each sync clock pulse. Flip-flop 366 applies its output to the counter 362 through an OR gate 361. The output of flip-flop 366 when in its set condition will hereafter be designated as a paper-tape quiz pulse—PQP. This pulse is applied to an AND gate 367, so that when the next clock pulse occurs AND gate 367 will reset flip-flop 366. Thus the PQP pulse actually lasts about the interval between two clock pulses. When counter 362 reaches $U_t$, AND gate 338 is energized. Its output is used for two functions. First, AND gate 157 is energized which energizes OR gate 325, which resets flip-flop 324, which runs the paper tape forward. Second, the contents of the photocells 311—316 prior to the start of the paper motion is transferred to the flip-flops 341—346 via cathode followers 311—316 and AND gates 331—336.

Also, each time the counter 362 reaches its $U_f$ count state it also serves to advance the count of a 16-state counter 368, which is termed a flex-digit counter for the reason that for each digit read from the tape it advances one count. Each count output is designated as $1_f$—$16_f$. The flex-bit counter goes through its complete count sequence for each digit read from the counter. The flex-digit counter is initiated when an alpha symbol is sensed by the symbol senser 350. This together with the occurrence of a PQP pulse enables an AND gate 370 to apply an output to an OR gate 372. The output from this OR gate starts the flex-digit counter, which then advances responsive to $U_f$ and clock pulses.

While the bit and digit counters 362 and 368 are advanced, the paper tape is being moved forward. When the clock channel signal appears at cathode follower 310, if OR gate 317 is energized, indicating that some code character appears, AND gate 319 will be energized, which triggers the one-shot multivibrator, which sets flip-flop 324, stopping the paper. The set output of flip-flop 324 then appears, which permits the next reading cycle by enabling AND gate 348.

Referring to the flex-bit counter 362 again, it will be seen that the count output that precedes $M_f$ is applied to an AND gate 374, which, upon a clock pulse also being applied thereto, sets a flip-flop 376. The flip-flop stays set until the occurrence of the $T_f$ count output, at which time an AND gate 378, to which the $T_f$ output as well as a clock pulse are applied, can reset the flip-flop. The set output of flip-flop 376 thus exists during the $M_f$—$T_f$ count period. It is designated hereafter as the $7SG_f$ pulse.

Counters 362 and 368 may be any suitable cycling counters which are reset by a pulse input from one source and are advanced by other successively occurring pulses. A suitable arrangement of this type is shown, described, and claimed in an application assigned to a common assignee and called Gated-Delay Counter, by James E. Heywood, filed December 28, 1953, Serial No. 400,645. Its successive stages are flip-flops which are coupled by AND gates. The inputs to these AND gates are the previous stage output, as well as the advancing pulse. Each AND gate output resets the preceding flip-flop and sets the succeeding flip-flop.

The paper-to-magnetic-tape code converter and symbol senser 350 can consist of well-known code conversion and recognition circuits, such as diode matrices, which can serve to convert from one code to another, and also can provide recognition outputs for certain symbols which may be applied. The interconnections in such networks will vary with the code selected. Since in the embodiment of the invention which was constructed and operated the speed of operation required was well within that of relays, six relays, or rather six relay groups, were used with their contacts interconnected to provide code conversion and symbol recognition. An illustration of a code conversion by relay contacts is shown in an application by William H. Kautz for a Code Converter, filed September 12, 1955, Serial No. 533,681, and assigned to a common assignee. An illustration of a diode code converter which may also be used as a symbol senser is shown on pages 42 et seq. of High-Speed Computing Devices, by Engineering Research Associates, published in 1950, by McGraw-Hill Book Company. The reason that this code converter may also be used as a symbol senser is because, as shown, a recognition output as code conversion consisting of the energization of a predetermined one out of many lines is provided. Because of the number of relay contacts required, several relays were employed in each group. All the relays in each group were operated together; all the relays in each group were respectively associated to be driven by a different one of the flip-flops 341—346. It is believed that the construction of code converters and symbol sensers of the type required are well within the ability of those skilled in the art. A detailed showing of the relay contact interconnections employed would merely serve to lengthen and complicate this record without adding to an understanding of this invention, and accordingly these will not be shown. Furthermore, it is perfectly feasible to use the same code on magnetic tape as is used on paper tape. In such case the code converter circuits may be eliminated and all that would be required are the symbol-sensing circuits. This arrangement is intended to be included within the scope of this invention.

Attention is now directed to Figure 4, which is a block schematic diagram of the logic arrangements required for operation of the embodiment of the invention in response to the instructions received from the paper tape and also to Figure 5, which is the block schematic diagram of the tape-reading apparatus. In order to initiate the operation of the system, a pulse is received from a master-start pulse source 400, which may be included in an information-handling system with which this arrangement may be used, or may be independently initiated by the pressing of a button which connects to a source of potential. This master pulse is applied to an OR gate 402, the output of which is applied to an AND gate 404. This AND gate, upon receiving the next clock pulse from the clock-pulse source 322, sets a flip-flop 406. The output pulse from this flip-flop 406 when in its set condition is the pulse which initiates the operation of the paper-tape reading apparatus. This pulse is applied to AND gates 338 and 348 in Figure 3, whereby eventually the paper-tape advance mechanism is instructed to advance the paper tape to the next character for reading, timed by the read-pulse source 360.

Each time a character is read from the paper tape, a PQP pulse is generated and the flex-bit counter is cycled. When an alpha symbol is read, the output of the symbol senser 350 indicative thereof, together with the PQP pulse output from the flip-flop 366, are used to initiate the operation of the flex-digit counter 368 as described previously. This counter is advanced each time the flex-bit counter attains the $U_f$ count condition. When the twelfth state of this flex-digit counter 368 is reached, an output pulse designated as $12_f$ is applied to an OR gate 412. The output of the OR gate 412 is applied to an AND gate 414, which, upon the occurrence of the next $U_f$ and clock pulse, causes the flip-flop 406 to be reset. The paper-tape reader and advance mechanism then stops operating until the twelve digits which have been read can be written on magnetic tape. These twelve digits which are serialized are entered into a shift register 500 (on Figure 5) through an AND gate 502 and an OR gate 504. A shift-pulse generator 506 is energized to provide shift pulses through an OR gate 508. The seven shift pulses required to shift each character are timed to occur during the $7SG_f$ pulse output of flip-flop 376.

The alpha symbol signal together with the PQP pulse are also applied to an AND gate 416. This AND gate output together with a clock pulse is applied to a succeeding AND gate 418. The output of AND gate 418 sets a flip-flop 420. This flip-flop is reset at the end of twelve digits by output from AND gate 322, which occurs in response to a $U_f$ and $12_f$ input. The set output of the flip-flop 420 is applied through an OR gate 424 to an AND gate 426. This AND gate provides an output to an OR gate 428 when it also receives $U_f$ and $12_f$ signals from counters 362 and 368. The output of OR gate 428 is applied to magnetic-tape speed-control apparatus 430 to order the magnetic tape to run forward.

Besides the transport mechanism required for the paper tape, there is also required a transport mechanism for the magnetic tape. Such transport mechanisms are well known and commercially purchasable. A control system is required for both paper and magnetic-tape transport mechanisms, which are also well known and commercially purchasable. The control system for the magnetic-tape transport 430 is required to control the transport mechanism to advance the tape upon receiving a command pulse to go forward to stop the magnetic tape upon receiving a stop command pulse, and also to reverse the motion of the tape from either stop or forward operation upon receiving a reverse command pulse. Also required is that the magnetic-tape control mechanism provide output signals indicative of the command being carried out, namely, that the tape is running forward at speed, the tape is running in reverse at speed, or that the tape is stopped. As previously indicated, such mechanism is commercially purchasable. However, a preferred novel arrangement for the tape-speed control is described and claimed in an application by these inventors for a Control Apparatus, filed July 20, 1956, Serial No. 599,089. This magnetic-tape speed-control apparatus is represented by the rectangle 430. Thus, in response to the output of OR gate 428, the magnetic-tape speed control 430 orders the magnetic-tape transport mechanism to run the tape forward.

The alpha symbol signal and the PQP pulse are also applied, together with a clock pulse, to an AND gate 442. This sets a flip-flop 444. The output of flip-flop 444 initiates several operations. One of these is to initiate the writing of the alpha symbol, account number, and classification symbol which are now held in the shift register 500. The output of flip-flop 444, when in set condition, is applied to an AND gate 508. To this AND gate is also applied the output of the magnetic-tape speed control 430 when the speed control indicates that the tape is running forward at speed. The output of this AND gate 508 is applied to an OR gate 510. The output of OR gate 510 is applied to an AND gate 512, which upon the occurrence of a clock pulse sets a flip-flop 514. The output of the flip-flop 514 is applied to a three-stage cycling counter 516, which hereafter will be referred to as the tape-writing pulse generator 516. The tape-writing pulse generator cycles through each one of its three states continuously in response to flip-flop 514 remaining set. It provides one output when in its first count condition and a second output when in its third count condition.

When in its first count condition, the tape-writing pulse generator provides an output pulse which initiates the operation of a magnetic-tape-writing bit counter 518, which has nine count states. It is advanced through these count states by clock pulses. The first of these is a delay state, and the remaining ones of these are identified as $M_w$, $N_w$, $P_w$, $Q_w$, $R_w$, $S_w$, $T_w$, $U_w$. The output of the first count state of the tape-writing bit counter together with a clock pulse is applied to an AND gate 520. The output of this AND gate sets a flip-flop 522. This flip-flop is reset when the tape-writing bit counter 518 reaches its $T_w$ state, at which time this output together with a clock pulse is applied to another AND gate 524. Thus the set output of flip-flop 512 is present for seven counts. This output is known as $7SG_w$ pulse. It is applied to the OR gate 508, which can thus enable the shift-pulse generator 506 to provide shift pulses to step seven bits out of the shift register into a staticisor 528. The staticisor is well-known circuitry for converting serial data which is received from the register into parallel data. It actually consists of seven AND gates 528M—528F, to all of which are applied the output of the shift register. The AND gates are successively enabled by the respective $M_w$—$T_w$ outputs of the tape-writing bit counter. The AND gate outputs are applied to succeeding flip-flops 528M'—528F', which will then provide an output voltage pattern representative of the data received from the register. The flip-flops 528M'—F' are reset by the first pulse from the tape-writing pulse generator.

When the tape-writing pulse generator 516 counts to its third count, it provides a second output pulse which follows the first output pulse by the interval required for the staticisor 528 to be filled. This second output pulse is applied to advance a tape-writing digit counter 530. This counter has a total count capacity of 16 and its count outputs are represented by $1_w$ through $16_w$. It advances one count for every digit or character which is written on the tape, since the same signal which advances this counter, as will be shown below, also enables the writing of a digit on the tape. The counter is reset when an output from OR gate 510 occurs. As previously described, this OR gate is enabled through output from AND gate 508, which in turn was enabled by the flip-flop 444 one output and a signal from the tape-speed control 430, indicative that the tape was running forward.

The second tape-writing pulse is applied to an AND gate 532. The second required enabling input to this AND gate is received from an OR gate 450, shown in Figure 4a. The output of AND gate 532 is applied to the biased amplifiers 534M through 534T. Thus, those of these amplifiers to which a one is applied from flip-flops associated therewith 528M' through 528T' will write a one via the tape-writing heads 536M through 536T. Those amplifiers which are not receiving a one output from the associated flip-flops will write a zero. It should be noted at this point that flip-flops 528S' and 528T' apply their output to the succeeding associated amplifiers through OR gates 538S and 538T. The reason for inserting these OR gates between the flip-flop and the write amplifier will be shown subsequently herein.

OR gate 450 provides an output in response to a "one" output from a flip-flop 452 when in its set condition. Flip-flop 452 is set in response to flip-flop 444 being set, since the "one" output of flip-flop 444 is applied to an AND gate 454, which receives as its other enabling inputs an output from the tape-speed control indicative of the fact that the magnetic tape is going forward, a clock pulse, and an output from the OR gate 456 responsive to a $1_w$ pulse received from the tape-writing digit counter. It should also be noted that flip-flop 452 is reset at $12_w$ time by an output from counter 530 being applied to an OR gate 456, the output of which is applied to an AND gate 458, which in response to a clock pulse resets flip-flop 452. At $14_w$ time, OR gate 456 is enabled again to provide an input to AND gate 454, which sets flip-flop 452. This enables the account classification symbol to be written on the tape. At $15_w$ time, flip-flop 452 is reset again, thus preventing further writing through AND gate 532, in response to the $15_w$ count output being applied again to OR gate 456.

It should be noted from the above description that the writing of the twelfth digit which is in the first twelve digits being transferred from the paper tape to the magnetic tape is effectively set off from the remaining eleven digits by a blank space. This twelfth digit is one of the account-category symbols (DUK). The reason for providing such spacing is that it may be necessary to overwrite the existing category symbol with another category symbol indicative of an account classification change, and therefore space is left on either side of the account symbol to enable such overwrite without interfering with the data on either side of the account symbol.

When the tape digit counter 530 reaches its twelfth count, the output pulse $12_w$ indicative thereof is applied to an AND gate 460 in Figure 4b. This AND gate receives as its second input what may be termed a pre-write pulse, which is the output of OR gate 510 in Figure 5. This enables the AND gate to apply its output to a writing amplifier 540, shown in Figure 5, which energizes a tape-writing head 542 positioned over an eighth track on the tape which will henceforth be referred to as the marker track. The tape-writing head 542 applies a pulse, designated as a word pulse, in the marker track, which is written adjacent to the twelfth digit.

The output of AND gate 460 is also applied to an OR gate 462, the output from which is applied to an AND gate 464, which, upon the arrival of a clock pulse, sets a flip-flop 466. This flip-flop energizes an erase oscillator 545 in Figure 5, as long as it is in its set condition, to apply erasing signals to the tape-writing head over the marker track in which the word pulse has been written. It should be noted that this flip-flop is set subsequent to the energization of the marker-track word-pulse writing apparatus, and thus it will erase the marker track after the word pulse has been written as the tape continues to run forward. This insures that the marker track is kept clean of any other pulses that may either be left there from previous operations or may be caused by overwriting from the adjacent track. Flip-flop 466 continues enabling such erasure until it receives a signal from the magnetic-tape speed control that the magnetic tape has stopped, at which time it is reset. The marker track pulse is employed at a later time for indicating the commencement of the operation for writing the name-and-address word, if any, for this account number.

After the account-number data has been written and upon the occurrence of the $15_w$ pulse output from counter 530, a one-shot multivibrator 468 (Figure 4b) is driven by output from an AND gate 470 from its stable to its unstable condition in order to establish the timing for the interval required for the magnetic tape to travel the distance allotted for writing the additional account-identification data and up to the location where the beta symbol is written. The AND gate 470 drives the one-shot multivibrator when the $15_w$ pulse occurs in the presence of a "one" output of flip-flop 452. The magnetic tape continues to run forward, after the first twelve digits representing the account-number data have been written, for the interval timed by one-shot multivibrator 468. The output of the one-shot 468 is applied both to an AND gate 472 and to the two OR gates 538S and 538T. These OR gates have their outputs respectively connected to the two data-writing amplifiers 534S and 534T. Since the tape-writing pulse generator 516 has continued to cycle, it continues to provide the required writing pulses to AND gate 532. Since, however, flip-flops 528M' to 528T' were reset after the previous writing of the twelfth account-data digit, the tape-writing amplifiers merely continue to write zeros in the space wherein subsequently there will be over-written the name-and-address data. When the pulse from the one-shot multivibrator 468 is applied to the two OR gates, however, there is written on the tape the symbol for a beta, which consists of 0000011. It should be appreciated that this beta can be represented by any code character than the one herein, merely by connecting the output of the one-shot 468 to the similar OR gates in the illustrated manner.

As previously recited, the output of the one-shot multivibrator is also applied to the AND gate 472 in Figure 4b. Upon receiving the next clock pulse, this AND gate applies an output to an OR gate 474. The output of this OR gate is applied to the magnetic-tape speed control 430, to instruct it to reverse the direction of the magnetic tape. In response, the tape then is first brought to a stop, after which its motion is reversed. The beta symbol is written before the tape can be brought to a stop. The tape continues to run in a reverse direction until the word pulse which was previously written is read.

As shown in Figure 5, the input signal to the write amplifier 540 is also applied to an inverter 544. The output of the inverter 544 is applied to the AND gate 546. An inverter is merely an amplification stage which inverts the phase of the signal applied thereto. In the presence of an output from the inverter, the AND gate 546 is blocked and will not pass any signal which is applied to the other input to the AND gate from the connection between the amplifier 540 and the read-write head 542. Thus, only what is read by the head 542 is applied to the amplifier 548. In the absence of any input to amplifier 540, the word pulse written adjacent the account classification symbol is read and passed through the AND gate 546 to the amplifier 548.

The output of amplifier 548 is applied to an AND gate 476 (Figure 4b), which requires as its second input an output from the tape-speed control 430, indicative of the fact that the tape is running in reverse. When these two inputs are present, AND gate 476 applies an output to OR gate 478, which instructs the tape-speed control 430 to stop the tape. At this time, the account-number information which includes the alpha symbol, account number, and account classification has been written, a space has been allotted for name and address and a beta symbol has been written, and the magnetic tape has been returned to a position just before the word-marker pulse, which is adjacent to the account-number symbol.

The data to be entered thereafter is the additional account-identification data consisting of name-and-address data. The output of amplifier 548 upon the reading of the word pulse together with the output indicative of the fact that the magnetic tape is going in reverse are applied to an AND gate 480 (Figure 4a). This AND gate, in turn, applies its output to an OR gate 482. The output of this OR gate is applied to a number of other structures including an AND gate 484 (Figure 4b). Also required before AND gate 484 output can reset a succeeding "name-and-address-write" flip-flop 486 is an output from an OR gate 488. This, in turn, results from the application of the output of AND gate 490 to OR gate 488. AND gate 490 has three required inputs. One of these is derived from flip-flop 444 when in its set condition. A second and third required input is derived negatively when the account is one which has an actual name and address, or there is no "U" account, and there is no "D" account present. These signals are derived from the set outputs of flip-flops 4010 and 4014.

Three flip-flop circuits 420, 4014, and 4010 (Figure 4a) and their associated AND gates function effectively as a memory to store and indicate what the account classification is. Upon the occurrence of a paper quiz pulse (PQP) and the sensing of the alpha symbol, it will be recalled that AND gate 416, to which both of these signals are applied, applies its output to three AND gates 418, 419, and 421. Upon the occurrence of the next clock pulse, these three AND gates are enabled to respectively set flip-flops 420, 4014, and 4010, to which they are respectively connected. Flip-flop 420 remains set until counters 362 and 368, respectively, attain the $U_f$ and $12_f$ count state, at which time AND gate 422 is enabled to reset the flip-flop. However, before such resetting occurs, the account-number classification symbol is read and recognized.

The sensing of a "D" symbol, together with a PQP, which occurs each time a character is read, together with the "one" output of flip-flop 420, are all applied to AND gate 4015. The output from this AND gate resets flip-flop 4014. The sensing of a "U" symbol, together with a PQP, together with the "one" output of flip-flop 420, are all applied to AND gate 4012, whereby it is enabled to reset flip-flop 4010.

From the above it should become apparent that when a "K" account is sensed, both flip-flops 4010 and 4014 remain set and their "one" outputs are respectively indicative of a non-"U" and non-"D" account. If flip-flop 4010 is reset, then its "zero" output indicates a "U" account. If flip-flop 4014 is reset, then its "zero" output indicates a "D" account.

It should be noted that the setting of flip-flop 486 occurs while the tape is still running backwards. The output of flip-flop 444 is also applied to an OR gate 492, the output from which is applied to an AND gate 494. When the magnetic tape has stopped, an output indicative thereof is applied to AND gate 494, whereby it is enabled to apply its output to OR gate 402, which results in the resetting of flip-flop 444 and the setting upon the occurrence of the next clock pulse of flip-flop 406. The paper tape is then advanced, in the manner previously described, so that the name and address data may be read from the paper tape.

Referring to Figure 3, the stopping of the magnetic tape signified by outputs from the tape-speed control 430 and the fact that flip-flop 486 is in its one, or set, condition, is applied to an AND gate 384, the output of which is applied to the OR gate 372, whereby the flex-digit counter may be advanced in response to $U_f$ pulses from the flex-bit counter 362 and clock pulses. The paper tape is advanced and the shift register 500 is loaded with 12 digits of the name and address data in the same manner as described for the account number data. When the twelfth digit has been loaded, and the paper tape has been stopped, the magnetic-tape speed control 430 is signaled to start the tape forward by an output from OR gate 428 as the result of receiving an input from AND gate 426. This gate is energized by the $12_f$, $U_f$ pulses, indicative of the reading of 12 data characters, and by OR gate 424, which is energized by AND gate 4072, which is energized by set output from flip-flop 486 (indicating the current transfer of name and address) and by OR gate 4074, which is driven by AND gate 4076, which indicates that the magnetic tape is stopped and that the paper tape is being read. This time, as the tape runs forward, the account number flip-flop 444 is not set. An AND gate 550 is enabled to apply an output to OR gate 510 upon the simultaneous presence of the set output of the flip-flop 486 (name-and-address writer-start flip-flop) together with the output derived from amplifier 548 when the word pulse is read together with an output from the magnetic-tape speed control 430, indicative of the fact that the tape is running forward. OR gate 510 then sets flip-flop 514 through AND gate 512, when the next clock pulse occurs. This output initiates operation of the tape-writing digit counter 530, provides a pre-write pulse, and also initiates operation of the tape-writing-pulse generator to enable staticizing the contents of the register 500 with the subsequent writing of the staticizer onto the magnetic tape.

The pre-write pulse is applied to an AND gate 496 (Figure 4b). This AND gate also has applied thereto the one output from flip-flop 486 when it is set and the next clock pulse. This causes the setting of flip-flop 498, the one output of which is applied to the OR gate 450, which in turn enables AND gate 532 in Figure 5 to apply the output of the tape-writing-pulse generator to the write amplifiers 534M to 534T.

When the tape-writing digit counter 530 has counted through 12, indicative of the fact that the contents of register 500 have been emptied onto the magnetic tape, the $12_w$ pulse indicative thereof together with the one output of flip-flop 498, together with a $U_w$ pulse of the tape-digit counter 518, are all applied to an AND gate 499 (Figure 4b). The output of this AND gate is applied to the OR gate 474, which results in the ordering of the tape-speed control to reverse the motion of the tape. When AND gate 499 is energized by the $12_w$ pulse, AND gate 460 (Figure 4b), which has the pre-write pulse also applied, also receives a $12_w$ pulse, whereby amplifier 540 and writing head 542 are enabled by its output to write a word pulse adjacent the last digit which was written on the magnetic tape. Then, as before, when the tape is run in reverse, the word pulse is read and this, together with the output from the tape-speed control indicative of the fact that the tape is running in reverse, is applied to the AND gate 461 (Figure 4b), enabling an output which is applied to the OR gate 462, which through AND gate 464 sets flip-flop 466. This causes erasure of the marker track. Since the tape is going in the reverse direction, such erasure in the marker track results in the previously written word pulse being erased. In the manner described above, word pulses are successively advanced continuously in the forward direction to mark the location of the last digit or character written, so that on the next advance of the magnetic tape new words may be written at the end of previous words. The pre-write pulse is applied to an OR gate 483, the output of which is applied to an AND gate 485, which upon the occurrence of a clock pulse resets flip-flop 486.

A word pulse which is read with the tape going in reverse enables the AND gate 480 (Figure 4a) to apply its output to the OR gate 482. The output of OR gate 482 is applied to AND gate 4004, which upon arrival of a clock pulse, sets flip-flop 4002. The one output of this flip-flop together with the one output of flip-flop 498 are applied to an AND gate 4006, the output of which is applied to OR gate 488, which enables flip-flop 486 to be set again. This causes a new reading and writing cycle to occur.

It should be noted that, whenever the tape is run in reverse, upon a word pulse being read, AND gate 476 applies an output to OR gate 478, which provides an output signal informing the tape-speed control to stop the tape. However, due to the fact that the tapes are not instantaneously stopped, enough tape passes the erasing head to enable erasure of the previous word pulse. When the magnetic tape is fully stopped, the signal indicative thereof is applied to the AND gate 494 (Figure 4a). The output of flip-flop 486 is applied when in its set condition to OR gate 492 to enable AND gate 494 to apply its output through OR gate 402 and AND gate 404 to set flip-flop 406. This enables the reading cycle from the paper tape to again take place. As a result, the serial register is loaded and thereafter the magnetic-tape writing cycle is initiated again by the above-described circuitry.

Ultimately a beta symbol will be sensed on the paper tape, indicative of the end of the name and address data. This paper-tape beta symbol will appear hereafter as $B_t1$, in order to distinguish over the beta written on the magnetic tape. The recognition of this symbol by the symbol senser 350 is applied to an AND gate 4008 (Figure 4b). Another required input to this AND gate is a signal indicative of the fact that the account is not the "U" type from flip-flop 4010. The output of AND gate 4008 is applied to another AND gate 4016. Upon the occurrence of a clock pulse and the paper quiz pulse (PQP), the output of this AND gate sets a flip-flop 4018. The one output of flip-flop 4018 is used to reset flip-flop 4002. The zero output of this flip-flop is applied to an AND gate 4019 (Figure 4a). This output together with a reading of a word pulse and a signal indicating that the tape is going in reverse is required to enable AND gate 4019 to apply an output to OR gate 428 to thereby signal the speed control to start the tape forward again.

The reset output therefrom of flip-flop 4002 together with the set output from flip-flop 4018 are applied to an AND gate 480 in Figure 3. This AND gate has as its third required input an output from the bit counter 362 when in its $U_f$ condition. Output from AND gate 380 is applied through OR gate 361 to the counter 362, whereby it is reset and is permitted to advance in response to clock pulses. Thus, even though no more name-and-address data is read from the paper tape, the paper tape bit and digit counters continue to advance, permitting the shifting of data into the buffer register.

Referring to Figure 5, an AND gate 503 receives an enabling input from the flip-flop 4002 when in its one condition, thus enabling it to pass into the register any signals which are received from a spacing symbol generator 505. It should be noted that the AND gate 502 is disenabled due to not receiving any reset output from flip-flop 4002. When the paper-tape digit counter has counted to 12, flip-flop 4018 is reset by output from an OR gate 4022 responsive to output from AND gate 4020 which receives the $12_f$ and $U_f$ inputs from counters 362 and 368. This permits the paper-tape digit counters to come to a stop when they have completed their cycle, at which time the register 500 will have been filled with 12 complete digits which may consist of one or more of the name and address digits with the remainder up to 12 being the spacing-symbol digits. The spacing-symbol generator 505 may be any representation desired achieved by a succession of the presence or absence of voltage pulses. A cycling counter having selected outputs to provide the desired representation is an example of a suitable spacing-symbol generator.

After the transfer of the last word of the name and address onto the magnetic tape, which includes the spacing symbols, if any, flip-flop 4002 is left in its reset condition. Its output at that time, together with the output from AND gate 480 (word pulse and tape going in reverse) is applied to an AND gate 4024 (Figure 4a). This AND gate applies its output to an OR gate 4026. The output of the OR gate is applied to an AND gate 4028, which upon the occurrence of a clock pulse and the fact that the flip-flop 4030 is in its zero condition enables the flip-flop to be set. The one output of flip-flop 4030 together with a going-reverse signal from the tape-speed control, together with an alpha signal read from the magnetic tape when it is going in reverse, are all applied to an AND gate 4032. It should be noted that this alpha symbol is the one at the beginning of the account number which has just been written. The output of AND gate 4032 is applied to an OR gate 4034, the output of which is applied through an AND gate 4036 to set a flip-flop 4038. The output of the OR gate 4034 is also applied to OR gate 428 to instruct the magnetic-tape speed control to run the magnetic tape forward.

The next data to be read from the paper tape after the reading of the beta-flex symbol is one of the tape-spacing symbols. This can be either a "c" symbol or an "x" symbol, depending upon the amount of space desired. The magnetic tape continues to run forward until the beta symbol written thereon is sensed (by a reading means not shown). A signal indicative of the reading of the beta symbol from the magnetic tape ($B_t$) together with one output of flip-flop 4038 causes an AND gate 4040 to apply an output to an OR gate 4042. This OR gate output is simultaneously applied to two AND gates 4044, 4046. One of these, 4044, may be termed the "c" AND gate, and the other of these, 4046, may be termed the "x" AND gate. In response to the one of these symbols which is sensed on the paper tape by the symbol senser 350, a corresponding one of the AND gates 4044 or 4046 is enabled to drive an associated delay one-shot multivibrator, respectively 4048 and 4050. Thus, the one of the two multivibrators which is driven depends upon which symbol is read.

The output of both delay one-shot multivibrators is applied to an OR gate 4052, the output of which is applied to the OR gate 478, the output of which instructs the tape-speed control to stop the magnetic tape. Furthermore, the output of OR gate 4052 is also applied to an AND gate 4054, which upon receiving a clock pulse, causes a flip-flop 4056 to be set. The one output of flip-flop 4056 is applied to the OR gate 492, the output of which is applied to AND gate 494, and thereafter when the magnetic tape has completely stopped the paper-tape reading cycle is initiated again.

If the next symbol seen is again a "c" or an "x" symbol, AND gates 4044 or 4046 will energize one of the succeeding one-shot delay multivibrators accordingly. The reading of the "c" or "x" symbol, together with the output of flip-flop 4038 in its one condition will energize either an AND gate 4058 or an AND gate 4060, depending on whether an "x" or a "c" symbol is recognized. The outputs of both of these AND gates is applied to an OR gate 4062, the output of which is applied through OR gate 412 and AND gate 414 to reset flip-flop 406. The output of OR gate 4062 is also applied to an AND gate 4064. In addition, the $U_f$ output of the flex-bit counter is also applied to AND gate 4064. This enables the AND gate to apply an output to the OR gate 428, the output of which signals the magnetic-tape speed control 430 to cause the magnetic tape to run forward. The amount which the tape will run forward is determined by the one of the two delay one shots 4048 or 4050 which is triggered. Since the running forward of the tape is signaled when the spacing symbol is read and the output of either of the one shots at the end of the timing interval is applied through OR gate 4052 to OR gate 478 to signal the speed control to stop the tape.

The last of the spacing symbols on the paper tape is followed by a lambda symbol. When this is recognized by the symbol senser 350, a signal is applied to an AND gate 4066 (Figure 4b) together with the PQP pulse for that symbol. The output of AND gate 4066 resets flip-flop 4038. The PQP pulse, together with the set output of flip-flop 4038 is applied to an AND gate 4068. The output of this AND gate is applied to the OR gate 4042, which enables the AND gates 4044 or 4046 to be energized when the "c" or "x" symbol is read, after evidence of the beta symbol having been read from the magnetic tape no longer exists. In other words, the function of the AND gate 4068 is to enable the continual operation of the one-shot multivibrators in response to only "c" or "x" symbols being read from paper tape, since when a beta symbol signal is no longer present, AND gate 4040 can no longer provide an enabling signal. The next symbol seen on the paper tape after the lambda symbol will be an alpha symbol indicative of a new count occurring. This will start the entire cycle over again.

The above description is one for an account which is active in that it is a "K" account. When an inactive account occurs, as indicated by the symbol senser sensing a "D" symbol, flip-flop 4014 (Figure 4a) is reset by the output of AND gate 4015, as described previously. The reset output of flip-flop 4014 together with the set output of flip-flop 452 are applied to an AND gate 4070 (Figure 4b). The output of AND gate 4070 is applied to OR gate 478, enabling it to signal the tape-speed control to stop the tape motion. Flip-flop 452 must be set, since an account number is written with a "D" account. None of the other circuits having to do with the transfer of the name and address onto the magnetic tape are energized, and an entire new transfer cycle will occur upon the reading of the next alpha symbol on the paper tape.

The "U" category account is an account which must be given name and address space and item space but which has no name and address material to be transferred. The circuits described function to write the account number and the beta symbol on the magnetic tape and then reverse the tape and stop where the word pulse was written. However, the next character read from the paper tape will be a $B_{f1}$ symbol. This $B_{f1}$ symbol, together with the $U_f$ state of the paper bit counter 362, together with the set output of flip-flop 4010 indicative of the fact that it is in its "U" account state, are all applied to an AND gate 4033 (Figure 4b). The output of this AND gate is applied to the OR gate 4034, which in turn sets flip-flop 4038 to start a normal item region spacing cycle of operation in response to a reading of "x" and "c" symbols on the paper tape indicating the amount of activity space to be allotted.

It should be noted that flip-flop 486, which is the name and address write-start flip-flop, is reset by the pre-write pulse, which is applied to OR gate 483. This means that the writing of each word in the name and address subject matter turns off this flip-flop, and thus for each cycle in the writing of this name and address material, this flip-flop is reset anew.

On occasions in which the name and address data on the tape is actually modular 12, it is not necessary to fill the buffer register with any of the spacing symbols previously mentioned. This condition is noted by reading of the $B_{f1}$ symbol when the digit counter is in its first count condition and the bit counter is at its $U_t$ state.

These three signals are applied to an AND gate 4025 (Figure 4a), the output of which is applied to the OR gate 4026. The output of OR gate 4026 through AND gate 4028 serves to set flip-flop 4030 to its one state and is also applied to OR gate 483, whereby flip-flop 486 is reset to its zero state. With flip-flop 4030 in its "one" state, AND gate 4032 (Figure 4b) can provide an output when the alpha is read from magnetic tape while it is traveling in reverse to thereafter start a cycle of operations which results in the magnetic tape running forward a distance as determined by the symbols read from the paper tape. It should also be noted that the sensing of the alpha symbol going in reverse together with a clock pulse causes the AND gate 4029 (Figure 4a) to apply an output to an OR gate 4031, the output of which resets flip-flop 4030. Also reset is flip-flop 498, since the output of OR gate 482 is applied to AND gate 497. This AND gate serves to reset the name and address write flip-flop 498 when the next clock pulse arrives.

The structure described above carries forth the sequence of operation in accordance with the flow diagram shown in Figure 2. The apparatus keeps on transferring the information on the paper tape onto the magnetic tape and also sensing the instructions for the format and spacing sound on the paper tape for the magnetic tape layout. As indicated previously, the instructions need not specifically apply to the banking business. For example, in an inventory control system, the account number may identify a particular stock item, the classification number may indicate whether the stock item is one which is active, which is inactive, or not being stocked, or one which is reserved for a future use when a demand indicates that such stock item should be stocked. The name and address data may represent a plant and location where such stock item is kept. Transaction space may be used for inputs and withdrawals of stock items. If the particular system employed is one for insurance, then the account number may be the one for the insured, the classification symbol may represent the type of insurance contract, and the name and address be that of the insured. Activity transactions may represent dates and amounts of premium payments. It is thus believed that the system described and shown herein is one which has utility in other fields than the one described by way of example. The system itself may have independent utility for preparing magnetic tapes to be subsequently used with other information-handling systems, or may be used in conjunction with an information-handling system, as desired.

There has been described and shown herein a system for establishing a format on one storage medium, such as tape, from characters in the form of symbols on another medium having recorded for each different account, account-identifying data, such as the account-number and classification symbol, additional account-identifying data, such as the name-and-address and space-allotment symbols indicative of the space to be allotted for recording future transactions.

We claim:

1. A system for establishing a format on tape from characters in the form of symbols on a second storage medium which has recorded thereon for each different account, account-identifying data and space-allotment symbols, said format-establishing system comprising means for reading said characters from said storage medium, first means for sensing the reading of said account-identifying data, means responsive to said first means for transferring said account-identifying data onto said tape, second means for sensing the reading of said space-allotment symbols, means for establishing for each space-allotment symbol identified a predetermined time interval, and means responsive to said second means for sensing to move said tape during the established interval to establish space for recording future activity for said account.

2. A system for establishing a format on one tape from characters in the form of symbols written on another storage medium having recorded for each account, a new-account-identifying symbol account identifying data, on account-classification symbol and space-allotment symbols, said format-establishing system comprising means for reading said characters from said storage medium, means for identifying each symbol read, means responsive to said new account-identifying symbol being identified to transfer said account-identifying data to said tape, means responsive to said account-classification symbol being identified to allot a predetermined amount of space on said tape, means for writing a symbol on said tape identifying the end of said predetermined amount of space, means for establishing for each space-allotment symbol identified a predetermined time interval, and means responsive to a space allotment symbol being identified to move said tape beyond said predetermined space symbol during the established interval to establish space for recording future activity for said account.

3. A system for establishing a format on one tape from characters in the form of symbols on another storage medium having recorded for each account a new-account-identifying symbol, account-identifying data, an end-of-identifying-data symbol and space-allotment symbols, said format-establishing system comprising means for reading said characters from said storage medium, means for identifying each symbol read, means responsive to said new-account-identifying symbol being identified to transfer said account-identifying data to said tape, means responsive to said end-of-identifying-data symbol being identified to mark said tape accordingly, means for establishing for each space-allotment symbol identified a predetermined time interval, and means responsive to a space allotment symbol being identified to move said tape during the established interval following said end-of-identifying symbol data to establish space for recording future activity for said account.

4. A system for establishing a format on tape from characters in the form of symbols written on another storage medium having recorded for each account a new account-identifying symbol, account-identifying data, an account-classification symbol, idditional account-identifying data, an end-of-identifying data symbol and space allotment symbols, said format-establishing system comprising means for reading said characters from said storage medium, means for identifying each symbol read, means responsive to said new-account-identifying symbol being identified to transfer said account-identifying data to said tape, means responsive to said account-classification symbol being identified to allot a predetermined amount of space on said tape, means for writing a symbol on said tape identifying the end of said predetermined amount of space, means initiated by the writing of said predetermined space-identifying symbol to write said additional account-identifying data in said space, means for establishing for each space-allotment symbol identified a predetermined time interval, and means responsive to a space-allotment symbol being identified to move said tape beyond said predetermined space symbol during the establish interval to establish space for recording future activity for said account.

5. A system for establishing a format on one tape from characters in the form of symbols on a second tape having recorded for each account data to be transferred including a first symbol representative of the start of an account and a second symbol representative of the category of said account, and a third symbol representative of transaction spacing to be allotted, said format system comprising means for reading said characters from said second tape, buffer storage means for storing data output from said means for reading, means for moving said one tape, means responsive to the reading of a first symbol and to said predetermined count for actuating said one tape moving means, means for writing the contents of said buffer storage onto said one tape, means for counting the number of characters being written on said one tape, first means for providing an output pulse at the end of a predetermined interval responsive to a predetermined count output from said means for counting characters written on said one tape means for marking said one tape with a symbol responsive to the output from said first means, second means for providing an output pulse at the end of a predetermined interval responsive to the reading of said third symbol by said means for reading, and means responsive to an output pulse from said second means to inactivate said means for moving said one tape to establish space for recording future activity of said account.

6. A system for establishing a format on one tape from characters in the form of symbols on a second tape having recorded for each account data to be transferred including a first symbol representative of the start of an account, account-identification data and a second symbol representative of the category of said account, and a third symbol representative of transaction spacing to be allotted, said format system comprising means for moving said second tape, means for reading said characters from said second tape, buffer storage means for storing data output from said means for reading, first means to count the number of characters read, means to inactivate said second tape-moving means responsive to a predetermined count output from said first means to count, means for moving said one tape, means responsive to the reading of a first symbol and to said predetermined count for activating said one tape-moving means, means for writing the contents of said buffer storage onto said one tape, second means for counting the number of characters being written on said one tape, first means for providing an output pulse at the end of a predetermined interval responsive to a predetermined count being attained by said second means for counting, means responsive to output from said first predetermined interval means for writing a special symbol on said one tape, means responsive to said special symbol and said one tape motion for activating said second tape-moving means, means responsive to said third symbol being read to provide an output pulse at the end of a predetermined interval, and means to inactivate said one tape-moving means responsive to the output pulse of said third symbol responsive means.

7. A system for establishing a format on a first tape from characters in the form of symbols on a second tape having recorded for each account, data to be transferred including a new-account symbol, account-identification data, an account-classification symbol and additional account-identification data, an end-of-account identifying-data symbol, and symbols representative of transaction spacing to be allotted, said format system comprising first tape-moving means, second tape-moving means, means for reading characters from said second tape, buffer storage means for storing data output from said means for reading, means for ordering entry of all the characters read up to and including said account-classification symbol into said buffer store responsive to said new-account symbol being read, means responsive to said data having been transferred into said buffer store to activate said first tape-moving means and to inactivate said second tape-moving means, means responsive to said first tape being in motion and to said new-account symbol having been read to write the contents of said buffer store onto said first tape, means responsive to end of said writing and to said classification for measuring a first time interval, means responsive to the end of said first time interval for writing a special symbol on said first tape, means responsive to the end of said first interval to control said first tape-moving means to move said first tape back to where said classification symbol was written, means responsive to said first tape being back at said classification symbol location to activate said first and second tape-moving means, said character reading said buffer store means for transferring said additional account-identifying data onto said first tape between said account-classification symbol and said special marking symbol, means responsive to said end-of-account identifying symbol to terminate the operation responsive to said last-named means to activate, and means responsive to the reading of a symbol representative of a transaction spacing to be allotted to activate said first tape-moving means for a predetermined interval to establish space for the recording of future transactions.

References Cited in the file of this patent

UNITED STATES PATENTS

| | | |
|---|---|---|
| 2,540,654 | Cohen | Feb. 6, 1951 |
| 2,614,169 | Cohen | Oct. 14, 1952 |